(12) United States Patent
Shimada et al.

(10) Patent No.: US 9,115,234 B2
(45) Date of Patent: *Aug. 25, 2015

(54) WATER/OIL REPELLENT COMPOSITION, METHOD FOR PRODUCTION THEREOF, AND ARTICLE

(75) Inventors: Minako Shimada, Tokyo (JP); Kazunori Sugiyama, Tokyo (JP); Yuuichi Oomori, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 466 days.

This patent is subject to a terminal disclaimer.

(21) Appl. No.: 12/555,377

(22) Filed: Sep. 8, 2009

(65) Prior Publication Data

US 2010/0069564 A1 Mar. 18, 2010

Related U.S. Application Data

(63) Continuation of application No. PCT/JP2008/058127, filed on Apr. 25, 2008.

(30) Foreign Application Priority Data

Apr. 27, 2007 (JP) .................................. 2007-120228

(51) Int. Cl.
| | | |
|---|---|---|
| *C08F 220/24* | (2006.01) | |
| *C08F 214/18* | (2006.01) | |
| *D06M 15/248* | (2006.01) | |
| *D06M 15/256* | (2006.01) | |
| *D06M 15/263* | (2006.01) | |
| *D06M 15/277* | (2006.01) | |
| *C08F 220/36* | (2006.01) | |
| *C08F 220/18* | (2006.01) | |

(52) U.S. Cl.
CPC ........... *C08F 214/18* (2013.01); *C08F 214/186* (2013.01); *C08F 220/24* (2013.01); *D06M 15/248* (2013.01); *D06M 15/256* (2013.01); *D06M 15/263* (2013.01); *D06M 15/277* (2013.01); *C08F 220/36* (2013.01); *C08F 2220/1891* (2013.01); *D06M 2200/11* (2013.01); *D06M 2200/12* (2013.01)

(58) Field of Classification Search
CPC ......... C08F 214/08; C08F 2220/1891; D06M 15/248; D06M 2200/11
USPC .......................................... 526/245; 524/544
See application file for complete search history.

(56) References Cited

U.S. PATENT DOCUMENTS

| | | | | |
|---|---|---|---|---|
| 4,579,924 A | * | 4/1986 | Schwartz et al. | ............. 526/243 |
| 4,742,140 A | | 5/1988 | Greenwood et al. | |
| 4,900,569 A | * | 2/1990 | Le | ................. 526/245 |
| 6,180,740 B1 | | 1/2001 | Fitzgerald | |
| 6,472,019 B1 | | 10/2002 | Yamaguchi et al. | |
| 6,472,476 B1 | | 10/2002 | Soane et al. | |
| 6,716,944 B2 | * | 4/2004 | Maekawa et al. | ............. 526/245 |
| 6,774,176 B1 | * | 8/2004 | Nzudie et al. | ................. 524/544 |
| 6,933,338 B2 | * | 8/2005 | Sugimoto et al. | ............. 524/377 |
| 2005/0106326 A1 | * | 5/2005 | Audenaert et al. | ............. 427/394 |
| 2005/0211945 A1 | * | 9/2005 | Coppens et al. | ............. 252/8.57 |
| 2005/0267241 A1 | | 12/2005 | Sugimoto et al. | |
| 2007/0015867 A1 | * | 1/2007 | Maekawa et al. | ............. 524/544 |
| 2007/0088141 A1 | | 4/2007 | Kashiwagi | |
| 2007/0102349 A1 | * | 5/2007 | Duong et al. | ............. 210/500.27 |
| 2008/0076862 A1 | | 3/2008 | Sugimoto et al. | |

FOREIGN PATENT DOCUMENTS

| | | |
|---|---|---|
| EP | 1 004 701 A1 | 5/2000 |
| JP | 50-49179 | 5/1975 |
| JP | 62-138579 | 6/1987 |
| JP | 62-179517 | 8/1987 |
| JP | 05005013 A * | 1/1993 |
| JP | 08206422 A * | 8/1996 |
| JP | 2000-282015 | 10/2000 |
| JP | 2001-98033 | 4/2001 |
| JP | 2003-13364 | 1/2003 |
| JP | 2003-520871 | 7/2003 |
| WO | WO 02/083809 | 10/2002 |
| WO | WO 2004/035708 | 4/2004 |
| WO | WO 2005/047417 | 5/2005 |
| WO | WO 2006/022122 | 3/2006 |
| WO | WO 2008022985 A1 * | 2/2008 |

OTHER PUBLICATIONS

Machine translation of JP 08-206422 A, May 2012.*
U.S. Appl. No. 14/611,817, filed Feb. 2, 2015, Shimada, et al.

* cited by examiner

*Primary Examiner* — Nicole M Buie-Hatcher

(74) *Attorney, Agent, or Firm* — Oblon, McClelland, Maier & Neustadt, L.L.P.

(57) ABSTRACT

To provide a water/oil repellent composition which can give water/oil repellency to a surface of an article and has excellent durability (wash durability and heavy-rain durability), a method for producing such a composition, and an article which has water/oil repellency and is less susceptible to deterioration of water/oil repellency when it is washed or in heavy rain. A water/oil repellent composition which comprises a copolymer having polymerized units derived from monomer (a), polymerized units derived from monomer (b) and polymerized units derived from monomer (c). Here, monomer (a) is a compound represented by the formula: $(Z-Y)_nX$; wherein Z is a $C_{1-6}$ perfluoroalkyl group or the like; Y is a bivalent organic group or a single bond; n is 1 or 2; and X is a polymerizable unsaturated group; monomer (b) is a (meth) acrylate having no polyfluoroalkyl group and having an $C_{20-30}$ alkyl group; and monomer (c) is vinylidene chloride.

15 Claims, No Drawings

WATER/OIL REPELLENT COMPOSITION, METHOD FOR PRODUCTION THEREOF, AND ARTICLE

TECHNICAL FIELD

The present invention relates to a water/oil repellent composition, a method for producing such a water/oil repellent composition, and an article treated with such a water/oil repellent composition.

BACKGROUND ART

A method of treating an article with a water/oil repellent composition having a copolymer comprising polymerized units derived from a monomer having a polyfluoroalkyl group (hereinafter referred to as a $R^f$ group) dispersed in a medium is known as a method for giving water/and oil repellency to a surface of the article (e.g. a fiber product). Such a water/oil repellent composition is required not to lose the water/oil repellency substantially even when repeatedly subjected to washing (wash durability).

As a water/oil repellent composition with excellent water/oil repellency, the following water/oil repellent compositions have, for example, been proposed:

(1) a water/oil repellent composition containing a copolymer, as an indispensable component, which consists essentially of polymerized units derived from following monomer (a) and following monomer (b) (Patent Document 1):

monomer (a): a monomer having a $C_{1-6}$ perfluoroalkyl group (hereinafter referred to as a $R^F$ group), etc.;

monomer (b): a (meth)acrylate having an alkyl group having at least 15 carbon atoms, etc.;

(2) a water/oil repellent composition containing a copolymer, as an indispensable component, which contains polymerized units derived from following monomer (a) and monomer (b) in an amount of at least 30 mass % and less than 80 mass % and further contains polymerized units derived from monomer (c) (Patent Document 2):

monomer (a): a monomer having a $C_{1-6}R^F$ group, etc.;

monomer (b): a monomer having no $R^f$ group and having a cross-linkable functional group;

monomer (c): at least one monomer having no $R^f$ group (excluding monomer (b)), which contains the following monomer (c1) or (c2) in an amount of at least 50 mass % based on the total amount of monomer (c):

monomer (c1): a (meth)acrylate having a $C_{16-40}$ alkyl group, etc.; and monomer (c2): a monomer, of which the glass transition point of the homopolymer is from −50° C. to 40° C. (excluding monomer (c1)).

However, the water/oil repellent compositions (1) and (2) have a problem such that their water/oil repellency is likely to deteriorate when they are exposed to heavy rain. Therefore, a water/oil repellent composition is desired, of which the water/oil repellency does not substantially deteriorate even when it is exposed to heavy rain, i.e. a water/oil repellent composition with heavy-rain durability is desired.

Patent Document 1: WO02/083809
Patent Document 2: WO2004/035708

DISCLOSURE OF THE INVENTION

Object to be Accomplished by the Invention

The present invention is to provide a water/oil repellent composition which can give water/oil repellency to a surface of an article and has excellent durability (wash durability and heavy-rain durability), a method for its production, and an article which has water/oil repellency and is less susceptible to deterioration of the water/oil repellency by washing or heavy rain.

Means to Accomplish the Object

The water/oil repellent composition of the present invention is characterized in that it comprises a copolymer having polymerized units derived from the following monomer (a), polymerized units derived from the following monomer (b) and polymerized units derived from the following monomer (c):

monomer (a): a compound of following formula (1):

$$(Z-Y)_nX \tag{1}$$

where Z is a $C_{1-6}R^F$ group or a group of the following formula (2), Y is a bivalent organic group or a single bond, n is 1 or 2, and X is one of groups of the following formulae (3-1) to (3-5) when n is 1, or one of groups of the following formulae (4-1) to (4-4) when n is 2:

$$C_iF_{2i+1}O(CFX^1CF_2O)_jCFX^2— \tag{2}$$

where i is an integer of from 1 to 6, j is an integer of from 0 to 10, and each of $X^1$ and $X^2$ is a fluorine atom or a trifluoromethyl group;

$$—CR{=}CH_2 \tag{3-1}$$

$$—C(O)OCR{=}CH_2 \tag{3-2}$$

$$—OC(O)CR{=}CH_2 \tag{3-3}$$

$$—OCH_2\text{-}\phi\text{-}CR{=}CH_2 \tag{3-4}$$

$$—OCH{=}CH_2 \tag{3-5}$$

where R is a hydrogen atom, a methyl group or a halogen atom and $\phi$ is a phenylene group;

$$—CH[—(CH_2)_mCR{=}CH_2]— \tag{4-1}$$

$$—CH[—(CH_2)_mC(O)OCR{=}CH_2]— \tag{4-2}$$

$$—CH[—(CH_2)_mOC(O)CR{=}CH_2]— \tag{4-3}$$

$$—OC(O)CH{=}CHC(O)O— \tag{4-4}$$

where R is a hydrogen atom, a methyl group or a halogen atom, and m is an integer of from 0 to 4;

monomer (b): a (meth)acrylate having no $R^f$ group and having a $C_{20-30}$ alkyl group; and monomer (c): vinylidene chloride.

The above copolymer preferably further contains polymerized units derived from the following monomer (d):

monomer (d): a monomer having no $R^f$ group and having a cross-linkable functional group.

The proportion of the polymerized units derived from the monomer (b) is preferably from 10 to 70 mol % in the total (100 mol %) of polymerized units derived from the monomer (a) and the monomer (b).

The article of the present invention is an article treated with the water/oil repellent composition of the present invention.

The method of this invention for producing a water/oil repellent composition is characterized in that a monomer mixture comprising the monomer (a), the monomer (b) and the monomer (c) is polymerized in a medium in the presence of a surfactant and a polymerization initiator.

The above-mentioned monomer mixture preferably further contains the monomer (d).

The proportion of the monomer (b) is preferably from 10 to 70 mol % to the total (100 mol %) of the monomer (a) and the monomer (b).

Effects of the Invention

The water/oil repellent composition of the present invention can give water/oil repellency to a surface of an article and has excellent durability (wash durability and heavy-rain durability).

By the method of this invention for producing a water/oil repellent composition, it is possible to produce a water/oil repellent composition which can give water/oil repellency to a surface of an article and has excellent durability (wash durability and heavy-rain durability).

The article of this invention has water/oil repellency and is less susceptible to deterioration of the water/oil repellency by washing or heavy rain.

BEST MODE FOR CARRYING OUT THE INVENTION

In this specification, a compound represented by the formula (1) is referred to as compound (1). The same applies to compounds represented by other formulae. And, in this specification, a group represented by the formula (2) is referred to as group (2). The same applies to groups represented by in other formulae. And, a (meth)acrylate in this specification means an acrylate or a methacrylate. And, a monomer in this specification means a compound having a polymerizable unsaturated group.

<Water/Oil Repellent Composition>

The water/oil repellent composition of the present invention contains the copolymer as an indispensable component, and also contains a medium, a surfactant and an additive as the case requires.

(Copolymer)

The copolymer comprises polymerized units derived from monomer (a), polymerized units derived from monomer (b) and polymerized units derived from monomer (c) as indispensable units, preferably also contains polymerized units derived from monomer (d), and, if necessary also contains polymerized units derived from monomer (e).

Monomer (a):

Monomer (a) is compound (1):

$$(Z-Y)_n X \tag{1}$$

wherein Z represents a $C_{1-6}$ $R^F$ group or group (2):

$$C_i F_{2i+1} O(CFX^1 CF_2 O)_j CFX^2- \tag{2}$$

wherein i is an integer of from 1 to 6, j is an integer of from 0 to 10, and each of $X^1$ and $X^2$ is a fluorine atom or a trifluoromethyl group.

The number of carbon atoms in the $R^F$ group is preferably from 4 to 6. The $R^F$ group may have a straight chain structure or branched structure, preferably a straight chain structure.

The following groups may be mentioned as examples of Z:

$F(CF_2)_4-$, $F(CF_2)_5-$, $F(CF_2)_6-$, $(CF_3)_2 CF(CF_2)_2-$, $C_k F_{2k+1} O[CF(CF_3)CF_2O]_h-CF(CF_3)-$, etc.:

wherein k is an integer of from 1 to 6, and h is an integer of from 0 to 10.

Z is preferably $F(CF_2)_6-$ or $F(CF_2)_4-$.

Y is a bivalent organic group or a single bond. In the formula (1), the boundary between Z and Y should be determined so that the number of carbon atoms in Z is made to be the fewest.

The bivalent organic group is preferably an alkylene group. The alkylene group may have a straight chain structure or branched structure. The alkylene group may have —O—, —NH—, —CO—, —SO$_2$—, —CD$^1$=CD$^2$- (wherein each of D$^1$ and D$^2$ is a hydrogen atom or a methyl group), etc.

The following groups may be mentioned as examples of Y:

—CH$_2$—,

—CH$_2$CH$_2$—,

—(CH$_2$)$_3$—,

—CH$_2$CH$_2$CH(CH$_3$)—,

—CH=CH—CH$_2$—,

—S(CH$_2$)$_2$—,

—SO$_2$(SH$_2$)$_2$—,

—(CH2)$_3$S—(CH$_2$)$_2$—,

—(CH$_2$)$_3$—SO$_2$—(CH$_2$)$_2$—, etc.

Y is preferably —CH$_2$CH$_2$—.

n is 1 or 2.

X is one of groups (3-1) to (3-5) when n is 1, and one of groups (4-1) to (4-4) when n is 2;

$$—CR=CH_2 \tag{3-1}$$

$$—C(O)OCR=CH_2 \tag{3-2}$$

$$—OC(O)CR=CH_2 \tag{3-3}$$

$$—OCH_2-\phi-CR=CH_2 \tag{3-4}$$

$$—OCH=CH_2 \tag{3-5}$$

where R is a hydrogen atom, a methyl group or a halogen atom and $\phi$ is a phenylene group;

$$—CH[—(CH_2)_m CR=CH_2]— \tag{4-1}$$

$$—CH[—(CH_2)_m C(O)OCR=CH_2]— \tag{4-2}$$

$$—CH[—(CH_2)_m OC(O)CR=CH_2]— \tag{4-3}$$

$$—OC(O)CH=CHC(O)O— \tag{4-4}$$

where R is a hydrogen atom, a methyl group or a halogen atom and $\phi$ is a phenylene group;

n is preferably 1, and X is preferably the formula (3-3) or (3-2).

From a viewpoint of the polymerizability with other monomers, flexibility of a film of the copolymer, adherence property of the copolymer to an article, solubility in a medium, ease of emulsion polymerization, etc., compound (1) is preferably a (meth)acrylate having a $C_{1-6}$ $R^F$ group, further preferably a methacrylate having a $C_{1-6}$ $R^F$ group, and particularly preferably a methacrylate having a $C_{4-6}$ $R^F$ group. Compound (1) is further particularly preferably $C_6F_{13}C_2H_4OCOC(CH_3)=CH_2$ or $C_6F_{13}C_2H_4OCOCH=CH_2$.

Monomer (b):

Monomer (b) is a (meth)acrylate having no $R^f$ group and having a $C_{20\text{-}30}$ alkyl group.

When the number of carbon atoms in the alkyl group is at least 20, a water/oil repellent composition has heavy-rain durability. When the number of carbon atoms in the alkyl group is at most 30, handling in polymerization operation is easy, and the polymer can be obtained in good yield. The number of carbon atoms is preferably from 20 to 24.

Monomer (b) is preferably behenyl(meth)acrylate, more preferably behenyl acrylate.

Monomer (c):

Monomer (c) is vinylidene chloride.

The water/oil repellent composition has good heavy-rain durability because of the combination of polymerized units derived from monomer (a), polymerized units derived from monomer (b) and polymerized units derived from monomer (c).

Monomer (d):

Monomer (d) is a monomer having no $R^f$ group and having a cross-linkable functional group.

When the copolymer has polymerized units based on monomer (d), the durability (washing durability and heavy-rain durability) of the water/oil repellent composition will be further improved.

The cross-linkable functional group is preferably a functional group having at least one of a covalent bond, an ionic bond and a hydrogen bond, or a functional group which is capable of forming a cross-linked structure by interaction between such bonds.

The followings are preferred examples of such functional groups: an isocyanate group, a blocked isocyanate group, an alkoxysilyl group, an amino group, an alkoxymethylamide group, a silanol group, an ammonium group, an amide group, an epoxy group, a hydroxyl group, an oxazoline group, a carboxyl group, an alkenyl group, and a sulfonic acid group. An epoxy group, a blocked isocyanate group, a hydroxyl group, an alkoxysilyl group, an amino group, and a carboxyl group are particularly preferred.

Monomer (d) is preferably a (meta)acrylate, an acrylamide, a vinyl ether or a vinyl ester.

The following compounds may be mentioned as examples of monomer (d):

2-isocyanatoethyl(meth)acrylate, 3-isocyanatopropyl(meth)acrylate, 4-isocyanatobutyl(meth)acrylate, a 2-butanone oxime adduct of 2-isocyanatoethyl(meth)acrylate, a pyrazole adduct of 2-isocyanatoethyl(meth)acrylate, a 3,5-dimethylpyrazole adduct of 2-isocyanatoethyl(meth)acrylate, a 3-methylpyrazole adduct of 2-isocyanatoethyl(meth)acrylate, an ϵ-caprolactam adduct of 2-isocyanatoethyl(meth)acrylate, a 2-butanone oxime adduct of 3-isocyanatopropyl(meth)acrylate, and a pyrazole adduct of 3-isocyanatopropyl(meth)acrylate;

a 3,5-dimethylpyrazole adduct of 3-isocyanatopropyl(meth)acrylate, a 3-methylpyrazole adduct of 3-isocyanatopropyl(meth)acrylate, an ϵ-caprolactam adduct of 3-isocyanatopropyl(meth)acrylate, a 2-butanone oxime adduct of 4-isocyanatobutyl(meth)acrylate, a pyrazole adduct of 4-isocyanatobutyl(meth)acrylate, a 3,5-dimethylpyrazole adduct of 4-isocyanatobutyl(meth)acrylate, a 3-methylpyrazole adduct of 4-isocyanatobutyl(meth)acrylate, and an ϵ-caprolactam adduct of 4-isocyanatobutyl(meth)acrylate;

Methoxymethyl(meth)acrylamide, ethoxymethyl(meth)acrylamide, butoxymethyl(meth)acrylamide, diacetone acrylamide, γ-methacryloyloxypropyltrimethoxysilane, trimethoxyvinylsilane, vinyltrimethoxysilane, dimethylaminoethyl(meth)acrylate, diethylaminoethyl(meth)acrylate, dimethylaminopropyl(meth)acrylate, (meth)acryloylmorpholine, (meth)acryloyloxyethyltrimethylammonium chloride, (meth)acryloyloxypropyltrimethylammonium chloride, (meth)acrylamideethyltrimethylammonium chloride, and (meth)acrylamidepropyltrimethylammonium chloride;

t-butyl(meth)acrylamide sulfonic acid, (meth)acrylamide, N-methyl(meth)acrylamide, N-methylol(meth)acrylamide, N-butoxymethyl(meth)acrylamide, diacetone(meth)acrylamide, glycidyl(meth)acrylate, 2-hydroxyethyl(meth)acrylate, 2-hydroxypropyl(meth)acrylate, 4-hydroxybutyl(meth)acrylate, 3-chloro-2-hydroxypropyl methacrylate, a polyoxyalkylene glycol mono(meth)acrylate, (meth)acrylic acid, 2-(meth)acryloylxyethylsuccinic acid, 2-(meth)acryloylxyhexahydrophthalic acid, 2-(meth)acryloyloxyethyl acid phosphate, allyl(meth)acrylate, 2-vinyl-2-oxazoline, and a polycaprolactone ester of 2-vinyl-4-methyl-(2-vinyloxazoline)hydroxyethyl(meth)acrylate; and Tri(meth)allyl isocyanurate (T(M)AIC, manufactured by Nippon Kasei Chemical Co., Ltd.), triallyl cyanurate (TAC, manufactured by Nippon Kasei Chemical Co., Ltd.), phenylglycidylethylacrylate tolylenediisocyanate (AT-600, KYOEISHA CHEMICAL Co., Ltd.), and 3-(methylethylketoxime)isocyanatomethyl-3,5,5-trimethylcyclohexyl(2-hydroxyethylmethacrylate)cyanate (TECHCOAT HE-6P, manufactured by Kyoken Kasei).

Monomer (d) is preferably N-methylol(meth)acrylamide, N-butoxymethyl(meth)acrylamide, 2-hydroxyethyl(meth)acrylate, 4-hydroxybutyl(meth)acrylate, a 3,5-dimethylpyrazole adduct of 2-isocyanatoethyl(meth)acrylate, a 3,5-dimethylpyrazole adduct of 3-isocyanatopropyl(meth)acrylate, diacetone acrylamide, glycidyl methacrylate, a polycaprolactone ester of hydroxyethyl(meth)acrylate, a polycaprolactone ester of hydroxyethyl(meth)acrylate, AT-600, or TECHCOAT HE-6P. Monomer (d) is particularly preferably N-methylol(meth)acrylamide, 2-hydroxyethyl(meth)acrylate, 4-hydroxybutyl(meth)acrylate, a 3,5-dimethylpyrazole adduct of 2-isocyanatoethyl(meth)acrylate or a 3,5-dimethylpyrazole adduct of 3-isocyanatopropyl(meth)acrylate.

Monomer (e):

Monomer (e) is a monomer other than monomer (a), monomer (b), monomer (c), and monomer (d).

The following compounds may be mentioned as examples of monomer (e):

Methyl acrylate, ethyl acrylate, propyl acrylate, butyl methacrylate, cyclohexyl(meth)acrylate, 2-ethylhexyl(meth)acrylate, butyl methacrylate, n-hexyl(meth)acrylate, stearyl(meth)acrylate, vinyl acetate, vinyl propionate, butene, isoprene, butadiene, ethylene, propylene, vinyl ethylene, pentene, ethyl-2-propylene, butylethylene, cyclohexylpropylethylene, decylethylene, dodecylethylene, hexene, isohexylethylene, neopentylethylene, (1,2-diethoxycarbonyl)ethylene, (1,2-dipropoxycarbonyl)ethylene, methoxyethylene, ethoxyethylene, butoxyethylene, 2-methoxypropylene, pentyloxyethylene, cyclopentanoyloxyethylene, cyclopentylacetoxyethylene, styrene, α-methylstyrene, p-methylstyrene, hexylstyrene, octylstyrene, no aylstyrene, chloroprene, tetrafluoroethylene, vinyl chloride, and vinylidene fluoride;

N,N,-dimethyl(meth)acrylamide, a vinylalkyl ether, an alkyl halide vinyl ether, a vinylalkyl ketone, butyl acrylate, propyl methacrylate, benzyl(meth)acrylate, octyl(meth)acrylate, decyl methacrylate, cyclododecyl acrylate, lauryl(meth)acrylate, cetyl(meth)acrylate, 3-ethoxypropyl acrylate, methoxy-butyl acrylate, 2-ethylbutyl acrylate, 1,3-dimethylbutyl acrylate, 2-methylpentyl acrylate, aziridinylethyl(meth)acrylate, 2-ethylhexylplyoxyalkylene(meth)acrylate, polyoxyalkylene di(meth)acrylate; and an alkyl crotonate, an alkyl maleate, an alkyl fumarate, an alkyl citraconate, an alkyl mesaconate, triallyl cyanurate, allyl acetate, N-vinylcarbazole, maleimide, N-methylmaleimide, a (meth)acrylate having a silicone in its side chain, a (meth)acrylate having an urethane bond, a (meth)acrylate having a polyoxy alkylene chain with a terminal $C_{1-4}$ alkyl group, an alkylene di(meth)acrylate, etc.

The proportion of the polymerized units derived from monomer (a) is preferably from 10 to 80 mass %, more preferably from 20 to 80 mass %, in the copolymer (100 mass %), from the viewpoint of water/oil repellency and durability of the water/oil repellent composition.

The proportion of the polymerized units derived from monomer (b) is preferably from 10 to 70 mass %, more preferably from 10 to 65 mass %, further more preferably at least 10 mass % and less than 64 mass %, in the copolymer (100 mass %), from the viewpoint of water/oil repellency and durability of the water/oil repellent composition.

The proportion of the polymerized units derived from monomer (c) is preferably from 1 to 42 mass %, more preferably from 1 to 20 mass %, further more preferably from 5 to 15 mass %, in the copolymer (100 mass %), from the viewpoint of water/oil repellency and durability of the water/oil repellent composition.

The proportion of the polymerized units derived from monomer (d) is preferably from 0 to 15 mass %, more preferably from 0.1 to 10 mass %, in the copolymer (100 mass %), from the viewpoint of water/oil repellency and durability of the water/oil repellent composition.

The proportion of the polymerized units derived from monomer (e) is preferably from 0 to 79 mass %, more preferably from 0 to 64.9 mass %, in the copolymer (100 mass %), from the viewpoint of water/oil repellency and durability of the water/oil repellent composition.

The proportion of the polymerized units derived from monomer (b) is preferably from 10 to 70 mol %, more preferably from 15 to 65 mol %, further more preferably from 25 to 65 mol %, in the sum (100 mol %) of the polymerized units derived from monomer (a) and the polymerized units derived from monomer (b).

When the proportion of polymerized units derived from monomer (b) is at least 10 mol % in the sum (100 mol %) of the polymerized units derived from monomer (a) and the polymerized units derived from monomer (b), heavy-rain durability of the water/oil repellent composition will be further improved. When the proportion of polymerized units derived from monomer (b) is at most 70 mol % in the sum (100 mol %) of the polymerized units derived from monomer (a) and the polymerized units derived from monomer (b), heavy-rain durability with oil repellency can be realized.

The proportions of polymerized units derived from monomers in present invention are calculated based on the amounts of monomers charged for producing the copolymer.

(Medium)

The medium may, for example, be water, an alcohol, a glycol, a glycol ether, a glycol ester, a halogen compound, a hydrocarbon, a ketone, an ester, an ether, a nitrogenous compound, a sulfur compound, an inorganic solvent, or an organic acid. Among them, at least one selected from the group consisting of water, an alcohol, a glycol, a glycol ether and a glycol ester is preferred from the viewpoint of solubility and ease in handling.

The alcohol may, for example, be methanol, ethanol, 1-propanol, 2-propanol, 1-butanol, 2-butanol, 2-methylpropanol, 1,1-dimethylethanol, 1-pentanol, 2-pentanol, 3-pentanol, 2-methyl-1-butanol, 3-methyl-1-butanol, 1,1-dimethylpropanol, 3-methyl-2-butanol, 1,2-dimethylpropanol, 1-hexanol, 2-methyl-1-pentanol, 4-methyl-2-pentanol, 2-ethyl-1-butanol, 1-heptanol, 2-heptanol, or 3-heptanol.

The glycol or glycol ether may, for example, be ethylene glycol, ethylene glycol monomethyl ether, ethylene glycol monoethyl ether, ethylene glycol monobutyl ether, ethylene glycol monomethyl ether acetate, ethylene glycol monoethyl ether acetate, ethylene glycol monobutyl ether acetate, propylene glycol, propylene glycol monomethyl ether acetate, diethylene glycol monobutyl ether acetate, diethylene glycol monoethyl ether acetate, propylene glycol monomethyl ether, propylene glycol monoethyl ether, propylene glycol dimethyl ether, dipropylene glycol, dipropylene glycol monomethyl ether, dipropylene glycol dimethyl ether, dipropylene glycol monoethyl ether, tripropylene glycol, tripropylene glycol monomethyl ether, polypropylene glycol, or hexylene glycol.

The halogen compound may, for example, be a halogenated hydrocarbon, or a halogenated ether.

The halogenated hydrocarbon may, for example, be a hydrochlorofluorocarbon, a hydrofluorocarbon, or a hydrobromocarbon.

The halogenated ether may, for example, be a hydrofluoro ether.

The hydrofluoro ether may, for example, be a separated-type hydrofluoro ether or a non-separated-type hydrofluoro ether. The separated-type hydrofluoro ether is a compound wherein an $R^F$ or perfluoroalkylene group, and an alkyl or alkylene group, are connected via an etheric oxygen atom. The non-separated-type hydrofluoro ether is a hydrofluoro ether having a partially fluorinated alkyl or alkylene group.

The hydrocarbon may, for example, be an aliphatic hydrocarbon, an alicyclic hydrocarbon, or an aromatic hydrocarbon.

The aliphatic hydrocarbon may, for example, be pentane, 2-methylbutane, 3-methylpentane, hexane, 2,2-dimethylbutane, 2,3-dimethylbutane, heptane, octane, 2,2,4-trimethylpentane, 2,2,3-trimethylhexane, decane, undecane, dodecane, 2,2,4,6,6-pentamethylheptane, tridecane, tetradecane, or hexadecane.

The alicyclic hydrocarbon may, for example, be cyclopentane, methylcyclopentane, cyclohexane, methylcyclohexane, or ethylcyclohexane.

The aromatic hydrocarbon may, for example, be benzene, toluene, or xylene.

The ketone may, for example, be acetone, methyl ethyl ketone, 2-pentanone, 3-pentanone, 2-hexanone, or methyl isobutyl ketone.

The ester may, for example, be methyl acetate, ethyl acetate, butyl acetate, methyl propionate, methyl lactate, ethyl lactate, or pentyl lactate.

The ether may, for example, be diisopropyl ether, dioxane, or tetrahydrofuran.

The nitrogenous compound may, for example, be pyridine, N,N-dimethylformaldehyde, N,N-dimethylacetamide, or N-methylpyrrolidone.

The sulfur compound may, for example, be dimethyl sulfoxide, or sulfolane.

The inorganic solvent may, for example, be liquid carbon dioxide.

The organic acid may, for example, be acetic acid, propionic acid, malic acid, or lactic acid.

One of such media may be used alone, or two or more of the them may be used in combination as a mixture. When two or more of such media are used in combination as a mixture, one of them is preferably water. By using a mixture of media, control of solubility and dispersibility may be easy, and control of penetrating properties and wettability to an article and solvent drying speed at the time of manufacture may be easy.

The water/oil repellent composition of the present invention, when the composition contains 20 mass % of the copolymer, preferably contains from 0 to 40 mass %, more preferably from 1 to 20 mass %, of the above-mentioned media other than water.

(Surfactant)

The surfactant may be a hydrocarbon surfactant or a fluorinated surfactant, and, each of them includes an anionic surfactant, an nonionic surfactant, a cationic surfactant and a zwitterizonic surfactant.

From the viewpoint of dispersing stability, the surfactant is preferably a combination of a nonionic surfactant and a cationic surfactant, or an anionic surfactant alone, preferably a combination of a nonionic surfactant and a cationic surfactant.

The ratio of a nonionic surfactant to a cationic surfactant (a nonionic surfactant/a cationic surfactant) is preferably from 97/3 to 40/60 (mass ratio).

In a specific combination of a nonionic surfactant and an cationic surfactant, their total amount in the copolymer (100 mass %) can be adjusted to be at most 5 mass %, whereby hydrophilicity of the water/oil repellent composition is reduced to give excellent water repellency to an article.

The nonionic surfactant is preferably at least one member selected from the group of surfactants $s^1$ to $s^6$.

Surfactant $s^1$:

Surfactant $s^1$ is a polyoxyalkylene monoalkyl ether, a polyoxyalkylene monoalkenyl ether, a polyoxyalkylene monoalkapolyenyl ether or a polyoxyalkylene monopolyfluoroalkyl ether.

Surfactant $s^1$ is preferably a polyoxyalkylene monoalkyl ether, a polyoxyalkylene monoalkenyl ether or a polyoxyalkylene monopolyfluoroalkyl ether. As $s^1$, one of such surfactants may be used alone, or two or more of them may be used in combination.

An alkyl group, an alkenyl group, an alkapolyenyl group or a polyfluoroalkyl group (hereinafter collectively referred to as an $R^S$ group) preferably has from 4 to 26 carbon atoms. The $R^S$ group may have a straight chain structure or a branched structure. The branched-structured $R^S$ group is preferably a secondary alkyl group, a secondary alkenyl group or a secondary alkapolyenyl group. A part or all of the hydrogen atoms of the $R^S$ group may be substituted by fluorine atoms.

Specific examples of the $R^S$ group include an octyl group, an dodecyl group, a tetradecyl group, a hexadecyl group, a stearyl group (octadecyl group), a behenyl group (docosyl group), an oleyl group (9-octadecenyl group), a heptadecylfluorooctyl group, a tridecylfluorohexyle group, 1H,1H,2H,2H-tridecylfluorooctyl group, and a 1H,1H,2H,2H-nonafluorohexyl group.

A polyoxyalkylene (hereinafter referred to as POA) chain is preferably a catenated chain consisting of two or more of polyoxyethylene (hereinafter referred to as POE) chains and/or polyoxypropylene (hereinafter referred to as POP) chains. The POA chain may consists of one type of POA chains or two or more types of POA chains. When the POA chain consists of two or more types of POA chains, such POA chains are preferably linked to form blocks.

Surfactant $s^1$ is more preferably compound ($s^{11}$):

$$R^{10}O[CH_2CH(CH_3)O]_s-(CH_2CH_2O)_rH \quad (s^{11})$$

wherein $R^{10}$ is an alkyl group having at least 8 carbon atoms or an alkenyl group having at least 8 carbon atoms, r is an integer of from 5 to 50, and s is an integer of from 0 to 20. Some of the hydrogen atoms of the $R^{10}$ may be substituted by fluorine atoms.

When r is at least 5, the surfactant is soluble in water and homogeneously soluble in an aqueous medium, thus the water/oil repellent composition has good penetrating properties to an article. When r is at most 50, its hydrophilicity is suppressed and water repellency will be good.

When s is at most 20, the surfactant is soluble in water and homogeneously soluble in an aqueous medium, thus the water/oil repellent composition has good penetrating properties to an article.

When r and s are at least 2, the POE chains and the POP chains are linked to form blocks.

$R^{10}$ is preferably a straight chain or a branched chain.

r is preferably an integer of from 10 to 30.

s is preferably an integer of from 0 to 10.

The followings compounds may be mentioned as examples of compound ($s^{11}$), wherein the POE chains and the POP chains are linked in block form:

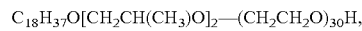

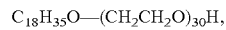

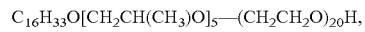

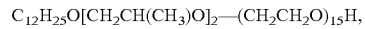

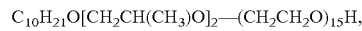

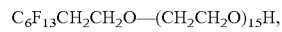

and

Surfactant $s^2$:

Surfactant $s^2$ is a nonionic surfactant made of a compound having at least one carbon-carbon triple bond and at least one hydroxy group in its molecule.

Surfactant $s^2$ is preferably a nonionic surfactant made of a compound having one carbon-carbon triple bond and one or two hydroxy group(s) in its molecule.

Surfactant $s^2$ may have a POA chain in the molecule. The POA chain may, for example, be a POE chain, a POP chain, a chain wherein POE chains and POP chains are linked in a random manner, or a chain wherein POE chains and POP chains are linked in block form.

Surfactant $s^2$ is preferably compounds ($s^{21}$) to ($s^{24}$):

$$HO-CR^{11}R^{12}-C\equiv C-CR^{13}R^{14}-OH \quad (s^{21})$$

$$HO\text{-}(A^1O)_u-CR^{11}R^{12}-C\equiv C-CR^{13}R^{14}-(OA^2)_v\text{-}OH \quad (s^{22})$$

$$HO-CR^{15}R^{16}-C\equiv C-H \quad (s^{23})$$

$$HO\text{-}(A^3O)_w-CR^{15}R^{16}-C\equiv C-H \quad (s^{24})$$

Each of $A^1$ to $A^3$ is an alkylene group.

Each of u and v is at least 0, and (u+v) is at least 1.

w is at least 1.

When each of u, v and w is at least 2, the plurality of each of $A^1$, $A^2$ and $A^3$ may be the same or different, respectively.

A POA chain is preferably a POE chain, a POP chain or a chain containing a POE chain and a POP chain. The number of repeating units of a POA chain is preferably 1 to 50.

Each of $R^{11}$ to $R^{16}$ is a hydrogen atom or an alkyl group.

The alkyl group is preferably a $C_{1-12}$ alkyl group, and more preferably a $C_{1-4}$ alkyl group. The alkyl group may, for example, be a methyl group, an ethyl group, a propyl group, a butyl group, or an isobutyl group.

Compound ($s^{22}$) is preferably compound ($s^{25}$);

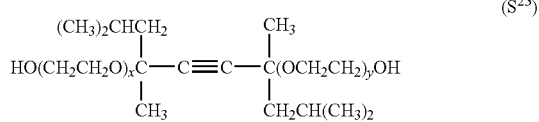

wherein each of x and y is an integer of from 0 to 100.

One of compound ($s^{25}$) may be used alone, or two or more of them may be used in combination.

Compound ($s^{25}$) is preferably a compound wherein both x and y are 0, the average of sum of x and y is from 1 to 4, or the average of sum of x and y is from 10 to 30.

Surfactant $s^3$:

Surfactant $s^3$ is a nonionic surfactant made of a compound, wherein a POE chain and a POA chain consisting of consecutively-connected two or more oxyalkylene having at least 3 carbon atoms are catenated, and both two terminals are hydroxy groups.

A polyoxytetramethylene (hereinafter referred to as POT) and/or a POP chain is preferred as such a POA chain.

Surfactant $s^3$ is preferably compound ($s^{31}$) or compound ($s^{32}$):

HO(CH$_2$CH$_2$O)$_{g1}$(C$_3$H$_6$O)$_t$(CH$_2$CH$_2$O)$_{g2}$H   ($s^{31}$)

HO(CH$_2$CH$_2$O)$_{g1}$(CH$_2$CH$_2$CH$_2$CH$_2$O)$_t$(CH$_2$CH$_2$O)$_{g2}$H   ($s^{32}$)

g1 is an integer of from 0 to 200.

t is an integer of from 2 to 100.

g2 is an integer of from 0 to 200.

When g1 is 0, g2 is an integer of at least 2. When g2 is 0, g1 is an integer of at least 2.

—C$_3$H$_6$O— may be —CH(CH3)CH2-, —CH2CH(CH3)-, or mixture of —CH(CH3)CH2- and —CH2CH(CH3).

The POA chains are in block form.

The following compounds may be mentioned as examples of surfactant $s^3$:

HO—(CH$_2$CH$_2$O)$_{15}$—(C$_3$H$_6$O)$_{35}$—(CH$_2$CH$_2$O)$_{15}$H,

HO—(CH$_2$CH$_2$O)$_{8}$—(C$_3$H$_6$O)$_{35}$—(CH$_2$CH$_2$O)$_{8}$H,

HO—(CH$_2$CH$_2$O)$_{45}$—(C$_3$H$_6$O)$_{17}$—(CH$_2$CH$_2$O)$_{45}$H, and

HO—(CH$_2$CH$_2$O)$_{34}$—(CH$_2$CH$_2$CH$_2$CH$_2$O)$_{28}$—(CH$_2$CH$_2$O)$_{34}$H.

Surfactant $s^4$:

Surfactant $s^4$ is a nonionic surfactant having an amine-oxide portion in the molecule.

Surfactant $s^4$ is preferably compound ($s^{41}$);

(R$^{17}$)(R$^{18}$)(R$^{19}$)N(→O)   ($s^{41}$)

wherein each of R$^{17}$ to R$^{19}$ is an monovalent hydrocarbon group.

A surfactant having an amine oxide (N→O) is regarded as the nonionic surfactant in the present invention.

One of compound ($s^{41}$) may be used alone, or two or more of them may be used in combination.

Compound ($s^{41}$) is preferably compound ($s^{42}$) from the viewpoint of dispersion stability of the copolymer;

(R$^{20}$)(CH$_3$)$_2$N(→O)   ($s^{42}$)

wherein R$^{20}$ is a C$_{6-22}$ alkyl group, a C$_{6-22}$ alkenyl group, a phenyl group combined with a C$_{6-22}$ alkyl group, a phenyl group combined with a C$_{6-22}$ alkenyl group, or a C$_{6-13}$ fluoroalkyl group. R$^{20}$ is preferably a C$_{8-22}$ alkyl group, a C$_{8-22}$ alkenyl group or a C$_{4-9}$ polyfluoroalkyl group.

The following compounds may be mentioned as examples of compound ($s^{42}$):

[H(CH$_2$)$_{12}$](CH$_3$)$_2$N(→O),

[H(CH$_2$)$_{14}$](CH$_3$)$_2$N(→O),

[H(CH$_2$)$_{16}$](CH$_3$)$_2$N(→O),

[H(CH$_2$)$_{18}$](CH$_3$)$_2$N(→O),

[F(CF$_2$)$_6$(CH$_2$)$_2$](CH$_3$)$_2$N(→O), and

[F(CF$_2$)$_4$(CH$_2$)$_2$](CH$_3$)$_2$N(→O).

Surfactant $s^5$:

Surfactant $s^5$ is a nonionic surfactant made of a polyoxyethylene mono(substituted phenyl) ether condensate or a polyoxyethylene mono(substituted phenyl) ether.

The substituted phenyl group is preferably a phenyl group substituted by a monovalent hydrocarbon group, and more preferably a phenyl group substituted by an alkyl group, an alkenyl group or a styryl group.

Surfactant $s^5$ is preferably a polyoxyethylene mono(alkylphenyl) ether condensate, a polyoxyethylene mono(alkenylphenyl) ether condensate, a polyoxyethylene mono(alkylphenyl) ether, a polyoxyethylene mono(alkenylphenyl) ether, or a polyoxyethylene mono[alkyl)(styryl)phenyl]ether.

The polyoxyethylene mono(substituted phenyl) ether condensate or polyoxyethylene mono(substituted phenyl) ether may, for example, be a formaldehyde condensate of polyoxyethylene mono(nonylphenyl) ether, polyoxyethylene mono (nonylphenyl) ether, polyoxyethylene mono(octylphenyl) ether, polyoxyethylene mono(oleylpheyl) ether, polyoxyethylene[(nonyl)(styryl)phenyl]ether, or polyoxyethylene mono [(oleyl)(styryl)phenyl]ether.

Surfactant $s^6$:

Surfactant $s^6$ is a nonionic surfactant made of a fatty acid ester of a polyol.

The polyol represents glycerin, sorbitan, sorbit, polyglycerin, polyethylene glycol, polyoxyethylene glyceryl ether, polyoxyethylene sorbitan ether, and polyoxyethylene sorbit ether.

Surfactant $s^6$ may, for example, be an ester derived from stearic acid and polyethylene glycol in 1:1 molar ratio, an ester derived from an ether of sorbit and polyethylene glycol, and oleic acid in 1:4 molar ratio, an ester derived from an ether of polyoxyethylene glycol and sorbitan, and stearic acid in 1:1 molar ratio, an ester derived from an ether of polyethylene glycol and sorbitan, and oleic acid in 1:1 molar ratio, an ester derived from dodecanoic acid and sorbitan in 1:1 molar ratio, an ester derived from oleic acid and decaglycerin in 1:1 or 2:1 molar ratio, and an ester derived from stearic acid and decaglycerin in 1:1 or 2:1 molar ratio.

Surfactant $s^7$:

When the surfactant contains a cationic surfactant, surfactant $s^7$ is preferred as such a cationic surfactant.

Surfactant $s^7$ is a cationic surfactant of a substituted ammonium salt form.

Surfactant $s^7$ is preferably an ammonium salt, wherein at least one hydrogen atom connected to the nitrogen atom is substituted by an alkyl group, an alkenyl group or a POA chain having a hydroxy group at the terminal, and is more preferably compound ($s^{71}$);

[(R$^{21}$)$_4$N$^+$].X$^-$   ($s^{71}$)

wherein $R^{21}$ is a hydrogen atom, a $C_{1-22}$ alkyl group, a $C_{2-22}$ alkenyl group, a $C_{1-9}$ fluoroalkyl group, or a POA chain having a hydroxy group at the terminal.

The four $R^{21}$ may be the same or different, however, all of the four $R^{21}$ are not hydrogen atoms at the same time.

$R^{21}$ is preferably a $C_{6-22}$ long-chain alkyl group, a $C_{6-22}$ long-chain alkenyl group, or a $C_{1-9}$ fluoroalkyl group.

When $R^{21}$ is an alkyl group other than a long-chain alkyl group, the $R^{21}$ is preferably a methyl group or an ethyl group.

When $R^{21}$ is a POA chain having a hydroxy group at the terminal, the POA chain is preferably a POE chain.

$X^-$ is a counter ion.

$X^-$ is preferably a chloride ion, an ethylsulfate ion or an acetate ion.

Compound ($s^{71}$) may, for example, be monostearyltrimethylammonium chloride, monostearyldimethylmonoethylammonium ethylsulfate, mono(stearyl)monomethyldi(polyethylene glycol)ammonium chloride, monofluorohexyltrimethylammonium chloride, di(tallow alkyl)dimethylammonium chloride, or dimethyl mono coconut amine acetate.

Surfactant $s^8$:

When the surfactant contains a zwitterizonic surfactant, surfactant $s^8$ is preferred as such a surfactant.

Surfactant $s^8$ is alanine, imidazolinium betaine, amidebetaine or betaine acetate.

The hydrophobic group is preferably a $C_{6-22}$ long-chain alkyl group, a $C_{6-22}$ long-chain alkenyl group, or a $C_{1-9}$ fluoroalkyl group.

Surfactant $s^8$ may, for example, be dodecylbetaine, stearylbetaine, dodecylcarboxymethylhydroxyethyl imidazolinium betaine, dodecydimethylaminoacetate betaine, or fatty acid amidepropyl dimethylaminoacetate betaine.

Surfactant $s^9$:

Surfactant $s^9$ may used as the surfactant.

Surfactant $s^9$ is a polymeric surfactant made of a block copolymer, a random copolymer or a hydrophobically modified body of a hydrophilic copolymer derived from a hydrophilic monomer and a hydrophobic hydrocarbon and/or a fluoro monomer.

Surfactant $s^9$ may, for example, be a block or random copolymer derived from polyethylene glycol(meth)acrylate and a long-chain alkyl acrylate, a block or random copolymer derived from polyethylene glycol(meth)acrylate and a fluoro (meth)acrylate, a block or random copolymer derived from vinyl acetate and a long-chain alkyl vinyl ether, a block or random copolymer derived from vinyl acetate and a long-chain alkylvinyl ester, a polymer derived from styrene and maleic anhydride, a condensate of polyvinyl alcohol and stearic acid, a condensate of polyvinyl alcohol and stearyl mercaptan, a condensate of polyallylamine and stearic acid, a condensate of polyethyleneimine and stearyl alcohol, methylcellulose, hydroxypropylmethylcellulose, or hydroxyethylmethylcellulose.

Examples of a commercial product of surfactant $s^9$ include MP Polymer (item code: MP-103, MP-203) manufactured by Kurary Co., Ltd., SMA resins manufactured by Elf Atochem Inc., METOLOSE manufactured by Shin-Etsu Chemical Co., Ltd., EPOMIN RP manufactured by NIPPON SHOKUBAI Co., Ltd., and Surflon (item code: S-381, S-393) manufactured by AGC Seimi Chemical Co., Ltd.

Surfactant $s^9$ is preferably surfactant $s^{91}$ when the solvent is organic, or the organic content in the solvent is high;

Surfactant $s^9$: a polymeric surfactant made of a block or random copolymer (or a polyfluoroalkyl denaturalized body thereof) derived from a lipophilic monomer and a fluoromonomer.

Surfactant $s^{91}$ may, for example, be a copolymer derived from an alkyl acrylate and fluoro(meth)acrylate, or a copolymer derived from an alkylvinylether and a fluoroalkylvinylether.

Examples of a commercial product of surfactant $s^{91}$ include Surflon (item code: S-383, SC-100 series) manufactured by AGC Seimi Chemical Co., Ltd.

From the viewpoint of excellence in water repellency and durability of the water/oil repellent composition, combination of the surfactants is preferably a combination of surfactant $s^1$ and surfactant $s^7$; a combination of surfactant $s^2$ and surfactant $s^7$; a combination of surfactant $s^1$, surfactant $s^2$ and surfactant $s^7$; a combination of surfactant $s^1$, surfactant $s^3$ and surfactant $s^7$; or a combination of surfactant $s^1$, surfactant $s^2$, surfactant $s^3$ and surfactant $s^7$, and more preferably such combinations wherein surfactant $s^7$ is compound ($s^{71}$).

The proportion of the total amount of the surfactant is preferably from 1 to 6 mass % to the copolymer (100 mass %).

(Additive)

Additives may, for example, be a penetrant, an anti-foaming agent, a water absorbent, an anti-stat, an anti-crease agent, a texture conditioner, a film-forming aid, a water-soluble polymer (polyacrylamide, polyvinyl alcohol, etc.), a thermo-setting agent (melamine resin, urethane resin, etc.), an epoxy curing agent (isophthalic acid hydrazide, adipic acid dihydrazide, sebacic acid dihydrazide, dodecanedioic acid dihydrazide, 1,6-hexamethylene bis(N,N-dimethylsemicarbazide, 1,1,1',1'-tetramethyl-4,4'-(methylene-di-p-phenylene) disemicarbazide, spiroglycol, etc.), a thermosetting catalyst, a cross-linking catalyst, a synthetic resin, a fiber stabilizer, etc.

(Method for Producing Water/Oil Repellent Composition)

The water/oil repellent composition is produced, for example, by the following method (i) or (ii):

(i) a method wherein a monomer mixture comprising monomers (a) to (c) and, as necessary, (d) and/or (e) is polymerized in a medium in the presence of a surfactant and a polymerization initiator to obtain a solution, dispersion or emulsion of a copolymer, and then, as necessary, other media, other surfactants and additives are added thereto;

(ii) a method wherein a monomer mixture comprising monomers (a) to (c) and, as necessary, (d) and/or (e) is polymerized in a medium in the presence of a surfactant and a polymerization initiator to obtain a solution, dispersion or emulsion of a copolymer, then the copolymer is separated, and then, a medium, a surfactant, and as necessary additives are added to the copolymer.

The polymerization method may, for example, be dispersion polymerization, emulsion polymerization, or suspension polymerization.

The method wherein a monomer mixture comprising monomers (a) to (c) and, as necessary, (d) and/or (e) is emulsion-polymerized in an aqueous medium in the presence of a surfactant and a polymerization initiator to obtain an emulsion of a copolymer, is preferred as the method for producing a water/oil repellent compound.

It is preferred to pre-emulsify the mixture comprising monomers, a surfactant and an aqueous medium before emulsion polymerization from the viewpoint of yield improvement of the copolymer.

Examples of the polymerization initiator are a thermal polymerization initiator, an optical polymerization initiator, a radiation polymerization initiator, a radical polymerization initiator, an ionic polymerization initiator, etc., and a water-soluble or oil-soluble radical polymerization initiator is preferred.

Common polymerization initiators such as an azo polymerization initiator, a peroxide polymerization initiator, a redox polymerization initiator, etc. are used as a radical polymerization initiator depending on the polymerization temperature. The radical polymerization initiator is particularly preferably an azo compound, and further preferably a salt of an azo compound when polymerization is carried out in an aqueous medium. The polymerization temperature is preferably between 20° C. and 150° C.

A molecular weight modifier may be used in the polymerization of monomers. The molecular weight modifier is preferably an aromatic compound, a mercapto alcohol or a mercaptan, particularly preferably an alkylmercaptan. The molecular weight modifier may, for example, be mercaptoethanol, n-octylmercaptan, n-dodecylmercaptan, t-dodecylmercaptan, stearylmercaptan, or α-methylstyrene dimer ($CH_2$=C(Ph)$CH_2$C($CH_3$)$_2$Ph, wherein Ph is a phenyl group).

The proportion of polymerized units derived from monomer (b) is preferably from 10 to 70 mass %, more preferably from 10 to 65 mass %, further more preferably at least 10 mass % and less than 64 mass %, in the copolymer (100 mass %) from the viewpoint of water/oil repellency and durability of the water/oil repellent composition.

The proportion of polymerized units derived from monomer (c) is preferably from 1 to 42 mass %, preferably from 1 to 20 mass %, more preferably from 5 to 15 mass %, in the copolymer (100 mass %) from the viewpoint of water/oil repellency and durability of the water/oil repellent composition.

The proportion of polymerized units derived from monomer (d) is preferably from 0 to 15 mass %, more preferably from 0.1 to 10 mass %, in the copolymer (100 mass %) from the viewpoint of water/oil repellency and durability of the water/oil repellent composition.

The proportion of polymerized units derived from monomer (e) is preferably from 0 to 79 mass %, more preferably from 0 to 64.9 mass %, in the copolymer (100 mass %) from the viewpoint of water/oil repellency and durability of the water/oil repellent composition.

The proportion of monomer (b) is preferably from 10 to 70 mol %, more preferably from 15 to 65 mol %, in the total (100 mol %) of monomer (a) and monomer (b).

When the proportion of monomer (b) is at least 10 mol % in the total (100 mol %) of monomer (a) and monomer (b), the water/oil repellent composition has better heavy-rain durability. When the proportion of monomer (b) is at most 70 mol % in the total (100 mol %) of monomer (a) and monomer (b), the water/oil repellent composition obtains heavy-rain durability with oil repellency.

The mass average molecular weight (Mw) of the copolymer contained in the water/oil repellent composition of the present invention is preferably from 1,000 to 1,000,000, more preferably from 3,000 to 1,000,000. The ratio of mass average molecular weight (Mw) to number average molecular weight (Mn), ((Mw)/(Mn)), is preferably from 1 to 15, more preferably from 1 to 10.

Regarding the water/oil repellent composition of the present invention, the copolymer is preferably dispersed particles in the medium. The average particle size of the copolymer is preferably from 10 to 1,000 nm, more preferably from 10 to 300 nm, particularly preferably from 10 to 200 nm. When the average particle size is within such a range, a surfactant, a dispersant, etc. are not required in large amounts, water/oil repellency is good, dyed fabrics can be treated without color dulling, and the particles are stably-dispersed without precipitation in the medium. The average particle size is measured by a dynamic light scattering device, an electron microscope, etc.

The solid content concentration of the water/oil repellent composition of the present invention is preferably from 25 to 40 mass % in the water/oil repellent composition (100 mass %) immediately after the production thereof.

The solid content concentration of the water/oil repellent composition of the present invention is preferably from 0.2 to 5 mass % in the water/oil repellent composition (100 mass %) at the time of treating articles.

The solid content concentration of the water/oil repellent composition is calculated from the mass of the water/oil repellent composition before heating and the mass of it after drying in the convection-drying machine at the temperature of 120° C. for 4 hours.

The above water/oil repellent composition can give water/oil repellency to articles, and has excellent durability (wash durability and heavy-rain durability) because it comprises the copolymer having specific combinations of polymerized units.

Especially the combination of polymerized units derived from monomer (b), that is, polymerized units derived from a (meth)acrylate wherein the alkyl group has a restricted number of from 20 to 30 carbon atoms, and polymerized units derived from monomer (c), that is, polymerized units derived from vinylidene chloride, has better heavy-rain durability than conventional water/oil repellent compositions which comprise copolymers having no such combinations.

And, because the water/oil repellent composition of the present invention is based on monomer (a), which has an $R^F$ group having at most 6 carbon atoms, the content (the content when the solid content concentration of the water/oil repellent composition is 20 mass %) of perfluorooctane (PFOA), perfluorooctane sulfonate (PFOS), and their precursors and analogs, environmental impact of which is pointed out, is reduced to under the detection limit of analysis value of LC-MS/MS in the method disclosed in Japanese Patent Application No. 2007-333564.

<Article>

The article of the present invention is an article treated with the water/oil repellent composition of the present invention.

Examples of the article treated with the water/oil repellent composition of the present invention include fibers (natural fibers, synthetic fibers, blended fibers, etc.), various fiber products, nonwoven fabrics, resins, paper, leather, metal, stone, concrete, plaster, and glass.

An example of a method for treating the article is to coat or impregnate the article with the water/oil repellent composition by a publicly-known coating method and then to dry it.

Fabric products treated with the water/oil repellant composition of the present invention have softened textile because of softness of the coating, and are given water/oil repellency of high quality. And, they have excellent adhesion on the surface, and are given water/oil repellency by curing at a low temperature. And, because deterioration of the performance by friction and washing is small, the initial performance at the treatment can be stably maintained. Paper treated with the composition has excellent size property, water repellency and oil repellency even when dried under a low-temperature drying condition. When resins, glass or surface of metals is treated with the composition, a water/oil repellent coating film which has good adhesion to an article and good film-forming property is formed.

Examples

Now, the present invention will be described in detail with reference to Examples. It should be understood, however, that the present invention is by no means limited to these Examples.

Examples 1 to 4, and 10 to 18 are working examples of the present invention, and Examples 5 to 9 are Comparative Examples.

<Property of Copolymer>

The molecular weight was measured with respect to the copolymer recovered from the dispersion obtained in each of Examples 10 to 17 by the method described below.

(Method for Recovering Copolymer)

6 g of the emulsion was concentrated to obtain a concentrated liquid wherein the solid content was in the order of 40 mass %. Approximately 10 g of tetrahydrofuran (hereinafter referred to as THF) was dropwise added to the concentrated liquid, and the solid in the liquid was dissolved to obtain a THF solution. If the solid was hardly dissolved, the liquid was exposed to ultrasonic. The THF solution was dropped into 60 g of methanol, and was stirred to let solid precipitate. The obtained solid was collected by filtration under reduced pressure. And, it was dried under vacuum at a temperature of 35° C. overnight to obtain a copolymer.

(Molecular Weight)

The collected copolymer was dissolved to obtain a 0.5 mass % THF solution, and the solution was filtered through a 0.45 μm filter to obtain a sample for analysis. The number average molecular weight (Mn) and the mass average molecular weight (Mw) of this sample were measured. The measurement conditions were as follows:

Device: HLC-8220GPC, manufactured bay TOSHO Corp.,

Columns: 4 columns of TSK gel superHZ4000, superHZ3000, superHZ2500 and superHZ2000 connected in series, Measurement temperature: 40° C., Injection volume: 40 μL, Discharge rate: 0.35 mL/min, Eluent: THF, Standard sample: EasiCal PS-2, manufactured by Polymer Laboratories Inc.

(Wash Durability)

Water repellency was measured by the following procedure.

The object was washed repeatedly for 50 times by the water-wash method described in Annex Table 103 in JIS L0217. Next, it was dried in a room at a room temperature of 25° C. under a humidity of 60% overnight. Then, its water repellency was measured by the spray test described in JIS L1092. Water repellency was measured in grades listed in Table 1. +(−) beside the grade mean; that the property is slightly better(worse).

TABLE 1

| Water repellency level | State of object |
| --- | --- |
| 100 | No moistening or water drops on the surface |
| 90 | Slight water drops on the surface |
| 80 | Separate partial moistening on the surface |
| 70 | Moistening on the half of the surface |

TABLE 1-continued

| Water repellency level | State of object |
| --- | --- |
| 50 | Moistening over the entire surface |
| 0 | Completely wetted |

Oil repellency was measured by the following procedure.

The object was washed repeatedly for 5 times by the water-wash method described in Annex Table 103 in JIS L0217. Next, it was dried in a room at a room temperature of 25° C. under a humidity of 60% overnight. Then, its oil repellency was measured by the test method of AATCC-TM118-1966. Oil repellency was measured in grades listed in Table 2. +(−) beside the grade means that the property is slightly better (worse).

TABLE 2

| Oil repellency No. | Test liquid | Surface tension mN/m(25° C.) |
| --- | --- | --- |
| 8 | n-heptane | 20.0 |
| 7 | n-octane | 21.8 |
| 6 | n-decane | 23.5 |
| 5 | n-dodecane | 25.0 |
| 4 | n-tetradecane | 26.7 |
| 3 | n-hexadecane | 27.3 |
| 2 | Nujol 65 part/hexadecane 35 part | 29.6 |
| 1 | Nujol | 31.2 |
| 0 | Oil repellency less than that of No. 1 | — |

(Heavy-Rain Durability)

Rainfall test was carried out under the condition that rainfall amount was 100 cc/min, rainfall temperature was 20° C., and testing time was 10 or 20 minutes by the method described in JIS L1092(C) (Bundesmann Test). Water repellency was measured in 5 grades of from 1 to 5. The higher the grade, the better the water repellency. X beside water repellency grade means that water penetrates into the cloth being tested. +(−) beside the grade means that the property is slightly better(worse). The cloth of grade 3 or more is regarded to have water repellency.

Post-washing water repellency was measured after the cloth was washed repeatedly for 5 or 20 times, and left overnight under the condition that the room temperature was 25° C. and the humidity was 55% by the water-wash method described in Annex Table 103 in JIS L0217 (hereinafter referred to as air-drying property). And, the water repellency after the cloth was dried by heating in a pintenter at 120° C. for 60 seconds (hereinafter referred to as post-heated property) was also measured.

Example 1

The following materials were put into a glass beaker, heated at 60° C. for 30 minutes, and then mixed by a homo mixer (manufactured by NIHONSEIKI KAISHA Ltd., BIO MIXER) to obtain a mixed solution: 76.6 g of $C_6F_{13}C_2H_4OCOC(CH_3)=CH_2$ (hereinafter referred to as C6FMA) as monomer (a), 13.4 g of behenyl acrylate (hereinafter referred to as BeA) as monomer (b), 4.1 g of 3,5-dimethylpyrazole adduct of 2-isocyanatoethyl methacrylate (indicated by the formula (5) below, hereinafter referred to as D-BI) as monomer (d), 25.9 g of a 10 mass % aqueous solution of polyoxyethylene oleyl ether (ethylene oxide 20 mol adduct, manufactured by Kao Corp., EMULGEN-420, hereinafter referred to as PEO-20) as surfactant $s^1$, 5.2 g of a 10 mass % aqueous solution of monostearyltrimethylammonium chloride (hereinafter referred to as STMC) as surfactant s⁷ (compound (s⁷¹)), 5.2 g of a 10 mass % aqueous solution of ethylene oxide-propylene oxide polymeric substance (ethylene oxide 40 mass %, adduct, manufactured by NOF Corp., PRONONE-204, hereinafter referred to as P-204) as surfactant s³, 123 g of de-ionized water, 31 g of dipropyleneglycol (hereinafter referred to as DPG), and 1 g of n-dodecylmercaptane (hereinafter referred to as nDOSH).

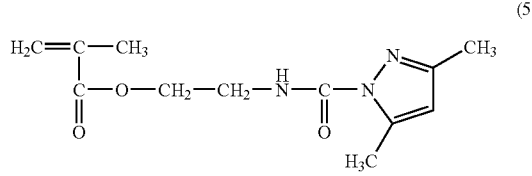

(5)

The mixed solution was treated by a high-pressure emulsification equipment (manufactured by APV Rannie, Mini-Lab) at 60° C. and at 40 MPa to obtain an emulsion. 230 g of the emulsion was put into a stainless-steel reaction container, and was cooled to 40° C. or lower. 9.3 g of vinylidene chloride (hereinafter referred to as VdCl) as monomer (c), and 4.1 g of a 10 mass % aqueous solution of 2,2'-azobis[2-(2-imidazoline-2-yl)propane] (manufactured by Wako Pure Chemical Industries, Ltd., VA061) acetate (hereinafter referred to as VA061A) as a polymerization initiator were added into the emulsion. Next, the gas phase was replaced with nitrogen, and then, polymerization was carried out at 60° C. for 15 hours with stirring to obtain a copolymer emulsion which had a solid content concentration of 32.6 mass %. The proportions of polymerized units derived from the respective monomers are shown in Table 3.

After the copolymer emulsion was diluted with distilled water to adjust the solid content concentration to 1 mass %, Sumitex Resin M-3 (manufactured by Sumitomo Chemical Co., Ltd., hereinafter referred to as M-3) and Sumitex Accelerator ACX (manufactured by Sumitomo Chemical Co., Ltd., hereinafter referred to as ACX) were added so that each concentration would be 0.3 mass % thereby to obtain a water/oil repellent composition.

A dyed nylon-cloth or a dyed polyester-cloth was soaked with the water/oil repellent composition, and the cloth was wrung to a wet pick-up of 40 mass % for nylon-cloth, or 98 mass % for polyester-cloth. This cloth was dried at 110° C. for 90 seconds, and then at 170° C. for 60 seconds to obtain a test cloth. Wash durability and heavy-rain durability of the test cloth were measured. The results are shown in Table 4.

Examples 2 to 4

A copolymer emulsion was obtained in the same manner as in Example 1 except that the amounts of the respective monomers charged were changed as shown in Table 3. The proportions of polymerized units derived from the respective monomers are shown in Table 3.

A water/oil repellent composition was obtained in the same manner as in Example 1 except for using such an emulsion.

A test cloth was obtained in the same manner as in Example 1 except for using such a water/oil repellent composition. Wash durability and heavy-rain durability of the cloth were measured. The results are shown in Table 4.

Example 5

The following materials were put into a glass beaker, heated at 60° C. for 30 minutes, and then mixed by a homo mixer (manufactured by NIHONSEIKI KAISHA Ltd., BIO MIXER) to obtain a mixed solution: 76.6 g of C6FMA as monomer (a), 13.4 g of stearyl acrylate (hereinafter referred to as STA), 4.1 g of D-BI as monomer (d), 25.9 g of a 10 mass % aqueous solution of PEO-20 as surfactant s¹, 5.2 g of a 10 mass % aqueous solution of STMC as surfactant s⁷ (compound (s⁷¹)), 5.2 g of a 10 mass % aqueous solution of P-204 as surfactant s³, 123 g of de-ionized water, 31 g of DPG, and 1 g of nDOSH.

The mixed solution was treated by a high-pressure emulsification equipment (manufactured by APV Rannie, Mini-Lab) at 60° C. and at 40 MPa to obtain an emulsion. 230 g of the emulsion was put into a stainless-steel reaction container, and was cooled to 40° C. or lower. 4.1 g of a 10 mass % aqueous solution of VA061A as polymerization initiator was added into the emulsion. Next, the gas phase was replaced with nitrogen, and 9.3 g of vinyl chloride (hereinafter referred to as VCM) was introduced, and then, polymerization was carried out at 60° C. for 15 hours with stirring to obtain a copolymer emulsion which had a solid content concentration of 33.0 mass %. The proportions of polymerized units derived from the respective monomers are shown in Table 3.

A water/oil repellent composition was obtained in the same manner as in Example 1 except for using such an emulsion.

Test cloth was obtained in the same manner as in Example 1 except for using such a water/oil repellent composition. Wash durability and heavy-rain durability of the cloth were measured. The results are shown in Table 4.

Examples 6 to 8, and 10 to 18

A copolymer emulsion was obtained in the same manner as in Example 1 except that the amounts of the respective monomers charged were changed as shown in Table 3. The proportions of polymerized units derived from the respective monomers are shown in Table 3. In the table, C6FA is $C_6F_{13}C_2H_4OCOCH=CH_2$, and HEMA is 2-hydroxyethyl methacrylate. However, for Example 17, 1 part in mass of 4HBA (4-hydroxybutyl acrylate) was adopted alternate to HEMA.

A water/oil repellent composition was obtained in the same manner as in Example 1 except for using such an emulsion.

Test cloth was obtained in the same manner as in Example 1 except for using such a water/oil repellent composition. Wash durability and heavy-rain durability of the cloth were measured. The results are shown in Table 4.

The number average molecular weight (Mn) and the mass average molecular weight (Mw) of the copolymers obtained in Example 10 to 17 were measured. The results are shown in Table 5.

Example 9

A copolymer emulsion was obtained in the same manner as in Example 5 except that the amounts of the respective monomers charged were changed as shown in Table 3. The proportions of polymerized units derived from the respective monomers are shown in Table 3.

A water/oil repellent composition was obtained in the same manner as in Example 1 except for using such an emulsion.

Test cloth to be tested was obtained in the same manner as in Example 1 except for using such a water/oil repellent compositions. Wash durability and heavy-rain durability of the cloth were measured. The results are shown in Table 4.

TABLE 3

| | Charged amount (g) | | | | | | | | Polymerized units proportion (mass part) | | | |
|---|---|---|---|---|---|---|---|---|---|---|---|---|
| Ex. | (a) C6FMA | (a) C6FA | (e) STA | (b) BeA | (e) VCM | (c) VdCl | (d) D-BI | (d) HEMA | (a) C6FMA | (a) C6FA | (e) STA | (b) BeA |
| 1 | 76.6 | | | 13.4 | | 9.3 | 4.1 | | 74.0 | | | 13.0 |
| 2 | 53.3 | | | 38.4 | | 9.3 | 4.1 | | 52.2 | | | 34.8 |
| 3 | 36.0 | | | 54.0 | | 9.3 | 4.1 | | 34.8 | | | 52.2 |
| 4 | 55.3 | | | 37.6 | | 9.3 | | | 54.2 | | | 36.8 |
| 5 | 76.6 | | 13.4 | | 9.3 | | 4.1 | | 74.0 | | 13.0 | |
| 6 | | | | 90.0 | | 9.3 | 4.1 | | | | | 87.0 |
| 7 | 90.0 | | | | | 9.3 | 4.1 | | 87.0 | | | |
| 8 | 56.9 | | | 39.4 | | | 4.1 | | 56.7 | | | 39.3 |
| 9 | 76.6 | | 13.4 | | | 9.3 | 4.1 | | 74.0 | | 13.0 | |
| 10 | 69.8 | | | 23.3 | | 9.3 | | 1 | 67.5 | | | 22.5 |
| 11 | 51.7 | | | 41.4 | | 9.3 | | 1 | 50 | | | 40 |
| 12 | 41.4 | | | 51.7 | | 9.3 | | 1 | 40 | | | 50 |
| 13 | 62.1 | | | 20.7 | | 19.7 | | 1 | 60 | | | 20 |
| 14 | 41.4 | | | 41.4 | | 19.7 | | 1 | 40 | | | 40 |
| 15 | 41.4 | | | 20.7 | | 40.3 | | 1 | 40 | | | 20 |
| 16 | 54.3 | | | 18.1 | | 30 | | 1 | 52.5 | | | 17.5 |
| 17 | 36.2 | | | 36.2 | | 30 | | | 35 | | | 35 |
| 18 | | 54 | | 36 | | 9.3 | 4.1 | | | 52.5 | | 34.8 |

| | Polymerized units proportion (mass part) | | | | Polymerized unit | Solid |
|---|---|---|---|---|---|---|
| Ex. | (e) VCM | (c) VdCl | (d) D-BI | (d) HEMA | (b)/{(a) + (b)} (mol %) | content (mass %) |
| 1 | | 9.0 | 4.0 | | 16.6 | 32.6 |
| 2 | | 9.0 | 4.0 | | 43.0 | 32.7 |
| 3 | | 9.0 | 4.0 | | 62.9 | 32.9 |
| 4 | | 9.0 | | | 43.5 | 33.1 |
| 5 | 9.0 | | 4.0 | | — | 33.0 |
| 6 | | 9.0 | 4.0 | | 100 | 34.0 |
| 7 | | 9.0 | 4.0 | | — | 32.6 |
| 8 | | | 4.0 | | 44.0 | 32.7 |
| 9 | | 9.0 | 4.0 | | — | 32.9 |
| 10 | | 9 | | 1 | 30.7 | 32.6 |
| 11 | | 9 | | 1 | 51.5 | 32.7 |
| 12 | | 9 | | 1 | 62.4 | 32.9 |
| 13 | | 19 | | 1 | 30.7 | 33.1 |
| 14 | | 19 | | 1 | 57.0 | 33.0 |
| 15 | | 39 | | 1 | 39.9 | 34.0 |
| 16 | | 29 | | 1 | 30.7 | 32.6 |
| 17 | | 29 | | | 57.0 | 32.7 |
| 18 | | 9 | 4 | | 47.0 | 32.9 |

TABLE 4

| | Base cloth Nylon | | | | |
|---|---|---|---|---|---|
| | | | Bundesmann test | | |
| Measure | Water repellency level | Oil repellency No. | Initial | Post-washing (air-drying property) | Post-washing (post-heated property) |
| Frequency of washing | 50 | 5 | — | 5 | 5 | 20 |
| Rainfall testing time (min.) | — | — | 10 | 10 | 10 | 10 |
| Example 1 | 100 | 6− | 5− | — | 4-5 | 3-4 |
| Example 2 | 90+ | 5 | 5 | — | 4-5 | 3-4 |
| Example 3 | 100 | 4+ | 4+ | — | 4 | 4− |
| Example 4 | 90+ | 5 | 5 | — | 4− | 2 |
| Example 5 | 80++ | 5 | 4+ | — | 4− | 3 |
| Example 6 | 80 | 2− | 3− | — | 3− | x |
| Example 7 | 90+ | 5 | 4− | — | 3-4 | x |
| Example 8 | 100 | 4− | 5− | — | 4 | 3+ |
| Example 9 | 80+ | 6− | 4− | — | 4+ | 2+ |
| Example 10 | 90 | 6− | 4− | 3 | 4-5 | 3-4 |
| Example 11 | 100− | 5− | 4+ | 4− | 4-5 | 4 |
| Example 12 | 90 | 5− | 4.5 | 3.5 | 4 | 4 |
| Example 13 | 90 | 6− | 3 | 3 | 4− | 3-4 |
| Example 14 | 90 | 5− | 3 | 3 | 4− | 3 |
| Example 15 | 90− | 4− | 3 | 3− | 4 | 3 |
| Example 16 | 90+ | 4+ | 3+ | 3− | 4-5 | 3 |
| Example 17 | 90+ | 4+ | 3+ | 3− | 4-5 | 3 |
| Example 18 | 100− | 6− | 2− | — | 4 | 3 |

| | Base cloth Polyester | | | | |
|---|---|---|---|---|---|
| | Water repellency level | Oil repellency No. | Bundesmann test | | |
| Measure | | | Initial | Post-washing (post-heated property) | |
| Frequency of washing | 50 | 5 | — | 5 | 20 |
| Rainfall testing time (min.) | — | — | 10 | 20 | 10 |
| Example 1 | 80 | 5 | 5 | 5− | 4+ |
| Example 2 | 80+ | 5− | 5 | 5− | 4+ |
| Example 3 | 80 | 4 | 5 | 4-5 | 4+ |
| Example 4 | 80+ | 5− | 5− | 5 | x |
| Example 5 | 90 | 6− | 4− | 4 | 3− |

TABLE 4-continued

| | | | | | |
|---|---|---|---|---|---|
| Example 6 | 70+ | 0 | 2− | 1-2 | 1 |
| Example 7 | 80 | 5+ | 5− | x | 3− |
| Example 8 | 70 | 3 | 5− | x | x |
| Example 9 | 70 | 6− | 5− | 4+ | 3-4 |

TABLE 5

| | Mn | Mw | Mw/Mn |
|---|---|---|---|
| Example 10 | 9865 | 24539 | 2.5 |
| Example 11 | 11450 | 27313 | 2.4 |
| Example 12 | 12713 | 31978 | 2.5 |
| Example 13 | 10933 | 26993 | 2.5 |
| Example 14 | 13758 | 35111 | 2.6 |
| Example 15 | 14390 | 37444 | 2.6 |
| Example 16 | 12818 | 32745 | 2.6 |
| Example 17 | 13622 | 36005 | 2.6 |

INDUSTRIAL APPLICABILITY

The water/oil repellent composition of the present invention is useful as a water/oil repellent agent for fiber products (clothing items (sportswear, coats, blousons, work clothes, uniforms, etc.), bags, industrial materials, etc.), nonwoven fabrics, leather items, stone materials, concrete building materials, etc. It is also useful as a coating agent for filtering materials to be used for a liquid containing organic solvent or in the presence of vapor of the liquid, a surface-protecting agent, a coating agent for electronics or an antifouling coating agent. Further, it is useful also for an application to give water/oil repellency wherein it is mixed with polypropylene, nylon, etc., and then molded and shaped into fibers.

The entire disclosure of Japanese Patent Application No. 2007-120228 filed on Apr. 27, 2007 including specification, claims and summary is incorporated herein by reference in its entirety.

What is claimed is:

1. A water/oil repellent composition comprising a copolymer comprising polymerized units derived from following monomer (a), polymerized units derived from following monomer (b), and polymerized units derived from following monomer (c), and polymerized units derived from following monomer (d):

monomer (a): a compound of the following formula (1):

$$(Z—Y)_nX \quad (1)$$

wherein Z is a $C_{4-6}$ perfluoroalkyl group, Y is a bivalent organic group or a single bond, n is 1 and X is $$—OC(O)CR\!=\!CH_2 \quad (3\text{-}3)$$

wherein R is a hydrogen atom or a methyl group,
monomer (b): a (meth)acrylate having no polyfluoroalkyl group and having a $C_{20-24}$ alkyl group; and
monomer (c): vinylidene chloride; and
monomer (d): a monomer having no polyfluoroalkyl group and having a cross-linkable functional group which is at least one monomer selected from the group consisting of 2-hydroxyethyl(meth)acrylate and a 3,5-dimethylpyrazole adduct of 2-isocyanatoethyl(meth)acrylate,
wherein the proportion of the polymerized units derived from the monomer (b) is from 15 to 65 mol % in the total (100 mol %) of polymerized units derived from the monomer (a) and polymerized units derived from the monomer (b),
wherein said composition is in the form of an emulsion.

2. The water/oil repellent composition according to claim 1, which further comprises at least one medium selected from the group consisting of water, an alcohol, a glycol, a glycol ether, and a glycol ester.

3. The water/oil repellent composition according to claim 1, which further comprises a surfactant in an amount of from 1 to 6 mass % based on 100% mass % of the copolymer.

4. The water/oil repellent composition according to claim 3, wherein the surfactant is a nonionic surfactant or a cationic surfactant.

5. An article treated with the water/oil repellent composition as defined in claim 1.

6. A method for producing the water/oil repellent composition according to claim 1, which comprises polymerizing a monomer mixture comprising the following monomers (a), (b), (c) and (d) in a medium in the presence of a surfactant and a polymerization initiator:

monomer (a): a compound of the following formula (1):

$$(Z—Y)_nX \quad (1)$$

wherein Z is a $C_{4-6}$ perfluoroalkyl group, Y is a bivalent organic group or a single bond, n is 1 or 2, and X is $$—OC(O)CR\!=\!CH_2 \quad (3\text{-}3)$$

wherein R is a hydrogen atom or a methyl group;
monomer (b): a (meth)acrylate having no polyfluoroalkyl group and having a $C_{20-24}$ alkyl group;
monomer (c): vinylidene chloride; and
monomer (d): a monomer having no polyfluoroalkyl group and having a cross-linkable functional group which is at least one monomer selected from the group consisting of 2-hydroxyethyl(meth)acrylate and a 3,5-dimethylpyrazole adduct of 2-isocyanatoethyl(meth)acrylate.

7. The method for producing a water/oil repellent composition according to claim 6, wherein the proportion of the monomer (b) is from 10 to 70 mol % in the total (100 mol %) of the monomer (a) and the monomer (b).

8. The method for producing a water/oil repellent composition according to claim 6, wherein the monomers are emulsion-polymerized in an aqueous medium to obtain an emulsion of a copolymer.

9. The water/oil repellent composition according to claim 1, wherein monomer (a) comprises a methacrylate having a $C_{4-6}$ perfluoro group.

10. The water/oil repellent composition according to claim 1, wherein a proportion of polymerized units derived from monomer (a) is from 10 to 80 mass % based on 100 mass % of copolymer.

11. The water/oil repellent composition according to claim 1, wherein a proportion of polymerized units derived from monomer (a) is from 20 to 80 mass % based on 100 mass % of copolymer.

12. The water/oil repellent composition according to claim 1, wherein a proportion of polymerized units derived from monomer (c) is from 1 to 42 mass % based on 100 mass % of copolymer.

13. The water/oil repellent composition according to claim 1, wherein a proportion of polymerized units derived from monomer (c) is from 2 to 20 mass % based on 100 mass % of copolymer.

14. The water/oil repellent composition according to claim 1, wherein the proportion of the polymerized units derived from the monomer (b) is from 25 to 65 mol % in the total, 100 mol %, of polymerized units derived from the monomer (a) and polymerized units derived from the monomer (b).

15. The water/oil repellent composition according to claim 1, wherein a proportion of polymerized units derived from monomer (d) is from 0.1 to 10 mass % based on 100 mass % of copolymer.

* * * * *